T. B. ROGERS.
Corn Planter.
No. 25,047.
Patented Aug. 9, 1859.
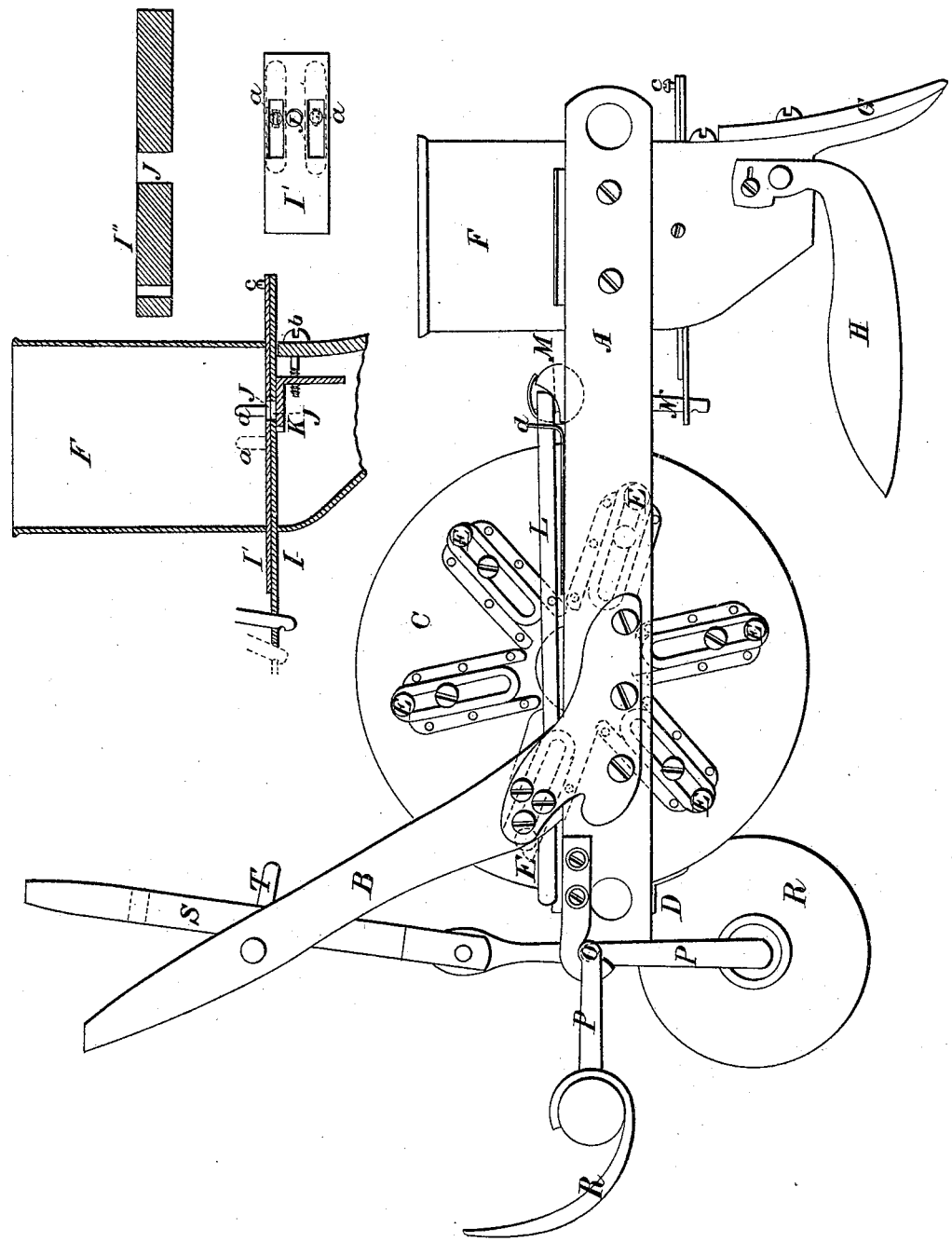
Witnesses:
Inventor:

UNITED STATES PATENT OFFICE.

THEODORE B. ROGERS, OF WETHERSFIELD, CONNECTICUT.

IMPROVEMENT IN SEED-PLANTERS.

Specification forming part of Letters Patent No. 25,047, dated August 9, 1859.

*To all whom it may concern:*

Be it known that I, THEODORE B. ROGERS, of Wethersfield, county of Hartford, and State of Connecticut, have invented certain new and useful Improvements in Seed-Planters; and I do hereby declare that the same is described and represented in the following specification and drawing; and to enable others skilled in the art to make and use the same, I will proceed to describe the construction and operation, referring to the drawing, in which the same letters indicate like parts in each of the figures.

The nature of my improvement in seed-planters consists in so constructing and arranging the operating parts thereof, that I am enabled to sow or drop seeds of various kinds and sizes—from the smallest to the largest—in drills, or at any desired intervals; also, to cut the seed—as, for instance, the potato—when it is larger than the ordinary sizes, while the machine is in operation of planting; also, forming the drill, covering it up again as the seed is planted, and marking off the ground on the right or left for the return row or drill, by the employment and improved arrangement of the several devices, and may be made convenient to be used by manual or horse power.

In the accompanying drawing is shown a side elevation.

A is the frame-work. B is the handles secured to the frame-work, and by which the machine is steadied and held in place.

C is the main operating-wheel revolving with or upon a shaft having its bearings in the frame-work or boxes secured to the frame-work.

D is a scraper, made with a lip projecting near the edge and each side of the wheel; the special and important object of which is to keep the wheel C cleaned from the soil, which would naturally accumulate thereon, especially if the soil be damp. Without the employment of said scraper in the manner herein described, its (the machine's) operation would be nearly defeated.

E are adjustable pins, more or less in number, as required, and made adjustable in any of the various ways.

F is the hopper into which the seed is placed, and is made such size as may be required, and secured between the frame-work A.

G is a drill-former, made in two parts, and in an adjustable manner, so as to admit its being raised and lowered or otherwise adjusted, according as circumstances require, and made in such shape as to turn the soil to the right and left and form a drill for the seed, and the two parts secured to the lower end of the hopper by a set screw or bolt.

H are floats having slots in one end, by which they are secured, and adjusted to the lower end of the hopper by a fulcrum-pin or bolt, and by which they may be changed either up or down and held in place. These floats are so shaped that the rear ends come nearer together than at the point where they are secured, so that they will close in the soil over the seed dropped from the hopper as the machine moves along.

I is a slide which is arranged in and moves back and forth in the hopper, having a hole or holes, J, of such a size as is required for the various sizes and kinds of seed, and having a hole in the rear end to receive the operating-arm.

*a a* are pins secured in said slide for the purpose of agitating the seed in the hopper.

I' is a slide representing duplicate slides the thickness and diameter of the hole, which is calculated to be such dimensions as to deal out the required amount of seed at a time.

I'' is a slide made in the same way of I', but differing, in that it has a metallic plate with a hole cut of such shape and size, and having a cutting-edge around said hole to receive the largest seeds, (as potatoes,) and of such depth as the size of the largest seeds for planting would require, so that should a larger seed fall therein it will cut it in two pieces, thus equalizing the larger seeds and giving out the required amount thereof at a time.

K is an adjustable slide moved back and forth by the screw *b*. The object of this is to regulate the alternate dropping of the seed. When it is desired to sow the seed, the slide K is drawn back close to the side of the hopper by the screw *b*, and the two plates I and I' are secured together by a screw, *c*. Thus allowing the seed to drop continuously by the motion of the slide.

L is a lever secured to the roller M, and extending back to the rear portion of the wheel C, having the end bent into a parallel line with itself, so as to allow the pins E successively, as the wheel C, revolves to lift said lever a certain height, then leaving it to fall partly by its own weight and by the joint action of the spring $d$. The arm N is secured to the roll M, and enters the hole in the rear end of the slide I.

O is a shaft extending across and is secured to the back end of the machine, and having two arms, P, one at each end of said shaft, projecting from the shaft, and at nearly right angles with each other, as seen looking in the line of the shaft O.

Upon the end of the arms P is formed bearings in parallel line with the shaft O, on which is secured a fixed or revolving marker, R. Nearly in the center of the shaft O is an arm rising a short distance, to which is secured the handle S, having two holes, by the use of which the marker R is alternately moved and held in downward position by simply changing the holes in the arms S on the pin T. The object of this marker is to mark the ground for the return row or drill.

It has long been desired to make a machine possessing the combined arrangements that will plant and sow from the smallest to the largest seed, and at the same time can be made and sold at such a price as will bring it within the means of the smallest farmer. It must therefore be looked upon as possessing advantages over others now or heretofore in use.

I do not claim the device as described and patented to J. German and C. B. Hoyt, March 18, 1856, S. Hutchinson, October 25, 1853, and J. Hazelton, May 12, 1857; but

What I claim, and desire to secure by Letters Patent, is—

The arrangement of slides I I' I'', lever L, former G, floats H, adjustable pins E, and marker R, as described, for the purpose set forth.

THEODORE B. ROGERS.

Witnesses:
   JEREMY W. BLISS,
   R. R. BLISS.